United States Patent [19]
Goldschmidt et al.

[11] 4,118,848
[45] Oct. 10, 1978

[54] METHOD OF MAKING GEAR AND SHAFT OR HUB ASSEMBLIES

[75] Inventors: Rolf Goldschmidt, Witten,Annen; Klaus Hansgen, Witten; Heinz M. Hiersig, Dusseldorf, all of Fed. Rep. of Germany

[73] Assignee: Mannesmann Aktiengesellschaft, Dusseldorf, Fed. Rep. of Germany

[21] Appl. No.: 766,078

[22] Filed: Feb. 7, 1977

[30] Foreign Application Priority Data

Feb. 13, 1976 [DE] Fed. Rep. of Germany ....... 2606245

[51] Int. Cl.² ........................ B23K 31/02; B23P 15/14
[52] U.S. Cl. .................................. 29/159.2; 228/170; 228/182; 228/232; 29/DIG. 21
[58] Field of Search ............. 29/159, 159.2, DIG. 21; 228/182, 231, 170, 229, 232, 230

[56] References Cited

U.S. PATENT DOCUMENTS

| 1,908,187 | 5/1933 | Ross | 29/159.2 |
| 2,221,415 | 11/1940 | Short | 228/182 X |
| 2,320,163 | 5/1943 | Anderson | 228/182 X |
| 2,730,795 | 1/1956 | Bloss | 29/159 R |

Primary Examiner—James L. Jones, Jr.
Assistant Examiner—K. J. Ramsey
Attorney, Agent, or Firm—Smyth, Pavitt, Siegemund, Jones & Mart Ella

[57] ABSTRACT

A rim element is at first provided with teeth and welded to an apertured disc. The resulting gear is temperhardened and subsequently assembled on a shaft or hub. The gear is welded to the shaft or hub and ground.

1 Claim, 4 Drawing Figures

METHOD OF MAKING GEAR AND SHAFT OR HUB ASSEMBLIES

BACKGROUND OF THE INVENTION

The present invention relates to a method of making a gear and mounting it on a shaft or a hub.

A gear, generally, is comprised of a wheel or disc and a gear or toothed rim. It is common practice to weld the wheel or disc to the rim as well as to the shaft, axle or hub. The teeth are, usually, milled, tempered (hardened) and ground or polished. The known manufacturing methods proceed as follows.

At first, the rim part is welded to the wheel, and the latter is thereafter welded to the hub or shaft. Next, the teeth are cut into the rim by milling. If the rim was already tempered, the gear is completed. However, it is quite impractical to mill after tempering. Moreover, in the specific practice to be improved by this invention, the welded and milled gear (including shaft or axle) is placed into a furnace for tempering, and the tempered gear is finally ground and, possibly, polished.

There is nothing basically wrong with that process of making a gear except that the combination of a shaft with a gear has quite a disadvantageous geometric configuration. Usually the shaft is considerably longer than the width of the teeth, the tempering furnace must be dimensioned to accommodate the assembly as to the entire shaft length, whatever that length happens to be. In reality, this constitutes a considerable waste in furnace space.

In view of the fact that the shaft or hub is also placed into the tempering furnace, one has to cover the bearing seats at the shaft ends or one may have to cover the interior of the hub in order to avoid inclusion of carbon. Alternatively, the shaft seats have to be ground later, e.g., when the teeth are ground. However, the latter grinding operation is quite different from the former, so that special machines are needed for grinding the shaft seats. Moreover, the shafts carry the gear at that time so that one cannot even use regular shaft grinders, because the respective gears are an impediment.

DESCRIPTION OF THE INVENTION

It is an object of the present invention to improve the known gear-shaft assembling method so that it is no longer required to place the shaft or hub into the tempering furnace, so that the furnace can be run on a much more economical basis, while the shaft grinding or seat covering can be avoided.

In accordance with the present invention, it is suggested to proceed as follows. At first a rim is welded to a wheel or disc, and the teeth are milled before or after the welding. The gear rim plus wheel assembly is then hardened in a tempering furnace. Next, the assembly is welded to a shaft, axle or hub whereafter the teeth are ground and, possibly, polished.

It can thus be seen that one can use a furnace with a large diameter but small depth or height. The shaft seats do not have to be covered nor is it necessary to grind or polish these seats because the shaft is not tempered in the process. Moreover, it was found that the method in its entirety is simpler, and such welded shaft-gear assemblies can now be used to a greater extent than assemblies using other than welded joints.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates a rim element 1 having teeth to establish a regular gear. The rim 1 is carried by a wheel or disc 3 which is connected to a shaft 5. The rim 1 has an internal ridge 4 by means of which the rim is welded to the other periphery of disc 3. Reference numeral 12 denotes the welding joint.

Figure 1:
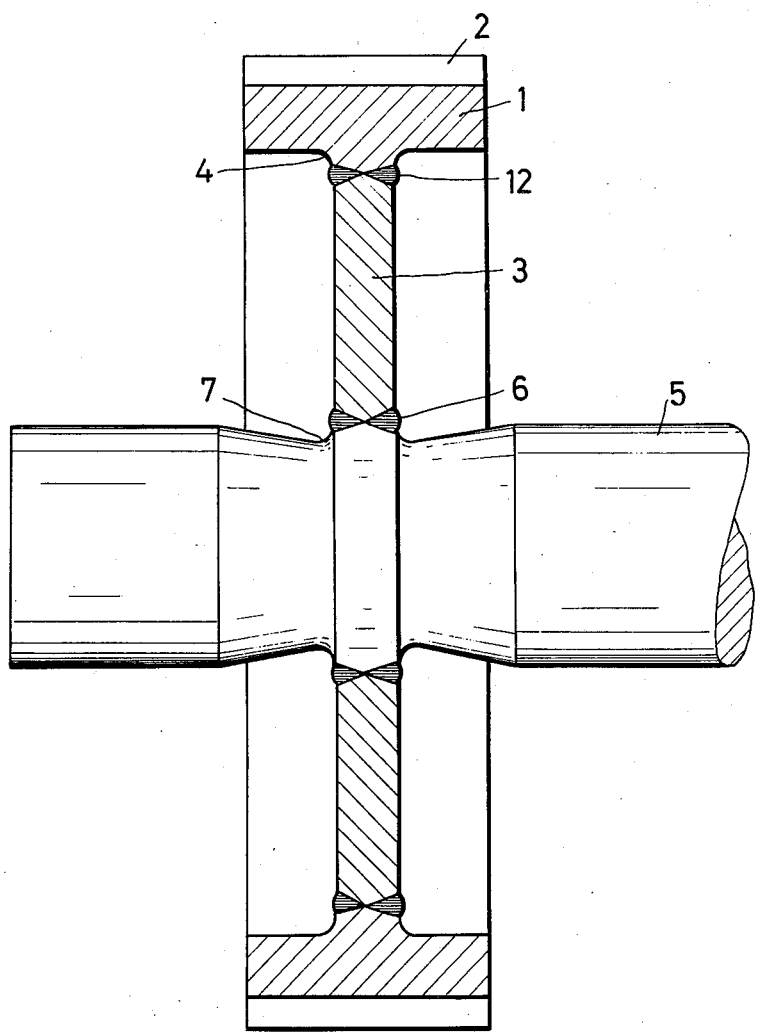
FIG. 1 shows a completed shaft, gear assembly in cross-section.

The disc or disc-shaped web 3 has a central aperture for receiving shaft 5, and the connection is made through welding resulting in a welding joint 6. The shaft was provided with two tapered grooves leaving a flange 7 along which the weld 6 is placed to particularly weld the inner periphery of the annulus 3 to the shaft along the outer periphery of flange 7.

Figure 3:
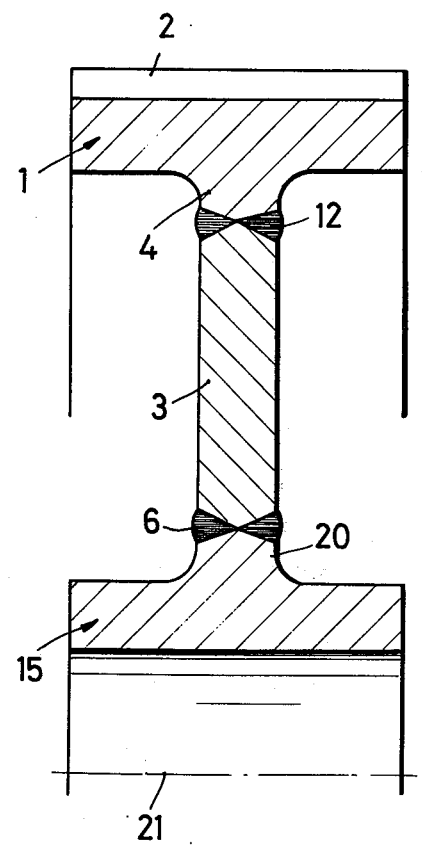
FIG. 3 is a cross-sectional view similar to FIG. 1 but showing a gear with a hub.

FIG. 3 shows a different configuration. Again there is a rim 1 with teeth 2; a wheel 3 and weld joints 6 and 12. The wheel or disc 3 is secured to a hub 15 having an annular flange 20 along which the inner aperture or bore of wheel 3 is welded thereto. Reference numeral 21 refers to the common axis of the hub 15 and of the gear.

Figure 4:
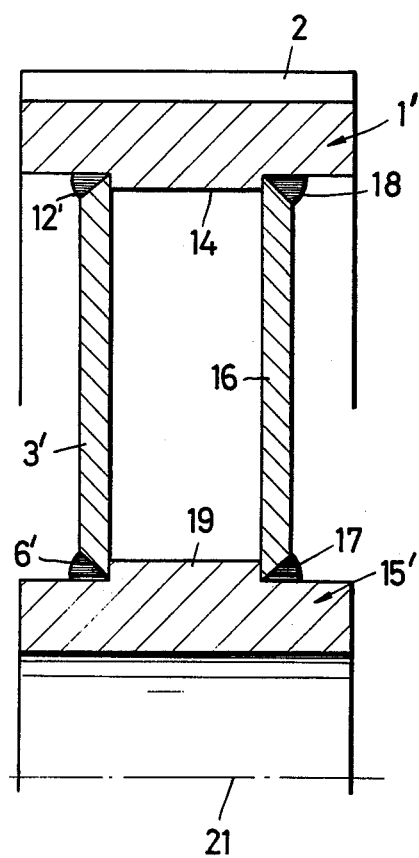
FIG. 4 is a cross-section through a modified hub/gear assembly showing two gear wheels.

FIG. 4 shows a wider rim element 1' with teeth 2', and a radially inwardly extending flange or annulus 14. A hub 15' is provided with a corresponding radially outwardly extending flange 19. Two apertured discs or wheels 3' and 16 are respectively welded to one and the other side of each of the flanges 14 and 19. Accordingly, there are four annular weld joints 6', 12', 17 and 18. The discs or wheels have bevelled edges to accommodate the weld.

Figure 2:
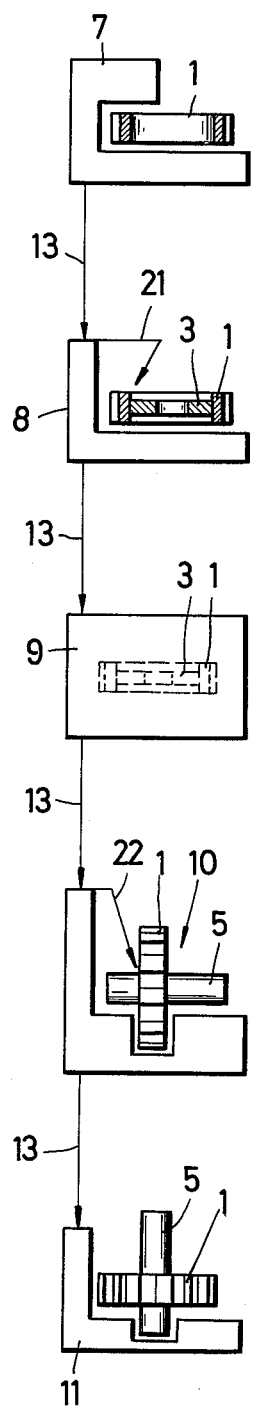
FIG. 2 is a schematic representation of an assembly line and process diagram for making such a gear.

Turning now to FIG. 2, the gears as per FIGS. 1, 3 and 4, and others, are made by means of a sequence of steps. These steps are carried out by processing equipment which includes a tooth milling station 17, a first welding station 8, a gear tempering furnace 9, a second welding station 10, and a tooth grinder 11.

The arrows 13 denote the sequence of process steps and of working the blanks involved. At the outset, rim elements such as 1 or 1' are separately provided, so are apertured discs or wheels and shafts or hubs. A rim part 1, i.e., such as a ring or annulus is milled in station 7 to cut teeth of desired contour and number. The teethed rim is then welded in station 8 to a flat apertured disc such as 3. The welding tool proper is schematically represented at 21. Stations 7 and 8 could be exchanged as to the sequence of operation.

Having completed the gear assembly, the gear is placed in a temperating furnace 9. The hardened gear is then placed into the second welding station 10 after the gear has been placed on the shaft 5. The two parts are welded together, reference numeral 22 denoting the welding tool proper. The gear plus shaft assembly is finally placed into station 11 for grinding and polishing the teeth; any shaft grinding is not needed.

The invention is not limited to the embodiments described above but all changes and modifications thereof not constituting departures from the spirit and scope of the invention are intended to be included.

We claim:

1. Method of making gears on a shaft or hub, comprising the steps of:

providing an annular rim element, at least one apertured disc or wheel element, and a shaft or hub element;

welding the annular rim element to the disc or wheel element and cutting teeth into the rim element, the welding and cutting steps being carried out in any sequence;

tempering the welded elements for hardening after the cutting of teeth;

assembling the welded and tempered elements with the shaft element and welding them together in a second welding step;

and polishing or grinding the teeth.

* * * * *